United States Patent
Aikens et al.

(10) Patent No.: US 7,552,198 B2
(45) Date of Patent: Jun. 23, 2009

(54) METHOD, SYSTEM, AND PROGRAM PRODUCT FOR PROVIDING ACCESS TO J2EE APPLICATION SERVERS FROM NON-J2EE APPLICATION CLIENTS

(75) Inventors: Glenn C. Aikens, Apex, NC (US); Kent F. Hayes, Jr., Chapel Hill, NC (US); Paul F. McMahan, Apex, NC (US); Joseph P. Nedimyer, Hillsborough, NC (US); James A. Stubley, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 981 days.

(21) Appl. No.: 11/038,914

(22) Filed: Jan. 20, 2005

(65) Prior Publication Data

US 2006/0161925 A1    Jul. 20, 2006

(51) Int. Cl.
*G06F 15/16* (2006.01)
(52) U.S. Cl. ............... 709/219; 709/203; 709/217; 709/218; 709/226; 709/229; 719/313
(58) Field of Classification Search ............ 709/203, 709/217, 218, 219, 226, 229; 719/313
See application file for complete search history.

(56) References Cited

U.S. PATENT DOCUMENTS

| | | | | |
|---|---|---|---|---|
| 7,003,570 | B2 * | 2/2006 | Messinger et al. | 709/226 |
| 7,076,798 | B2 * | 7/2006 | Chang et al. | 726/4 |
| 7,080,119 | B2 * | 7/2006 | Felt et al. | 709/203 |
| 7,447,781 | B2 * | 11/2008 | Chan et al. | 709/228 |
| 7,454,440 | B2 * | 11/2008 | Green et al. | 707/104.1 |
| 2003/0149689 | A1 | 8/2003 | Chow et al. | |
| 2003/0182651 | A1 | 9/2003 | Secrist et al. | |
| 2003/0191812 | A1 | 10/2003 | Agarwalla et al. | |

* cited by examiner

*Primary Examiner*—Liangche A Wang
(74) *Attorney, Agent, or Firm*—Hoffman Warnick LLC

(57) ABSTRACT

The present invention provides a method, system, and computer program product for providing access to J2EE application servers from non-J2EE application clients. The method comprises: sending data from an application client to a staging area; sending a message from the application client to a J2EE application server, the message notifying the J2EE application server that data is available in the staging area and providing a name of an adapter that can retrieve the data from the staging area; obtaining the adapter using a Message Driven Bean, wherein the Message Driven bean retrieves the data from the staging area using the adapter; and inserting the retrieved data into a database of the J2EE application server using the Message Driven Bean.

3 Claims, 4 Drawing Sheets

METHOD, SYSTEM, AND PROGRAM PRODUCT FOR PROVIDING ACCESS TO J2EE APPLICATION SERVERS FROM NON-J2EE APPLICATION CLIENTS

BACKGROUND OF THE INVENTION

1. Field of the Invention

The present invention generally relates to computer systems. More particularly, the present invention provides a method, system, and computer program product for providing access to J2EE application servers from non-J2EE application clients.

2. Related Art

The Java 2 Enterprise Edition (J2EE) framework provides many conveniences for application programmers such as transparent end-to-end security and seamless transaction support. However, one problem that adopters of the J2EE framework face is that in order for a distributed application to function correctly, each part of the application must have access to the context objects that are necessary to run within the framework. Examples of such context objects are security context, transaction context, and directory lookup (Java Naming and Directory (JNDI)) context. This requirement is not a problem for the server portion of the application because it is running within a J2EE container such as Websphere (available from IBM) where those context objects are provided natively. But the "remote" parts of the application such as an endpoint monitor or event emitter must obtain these context objects by running in a J2EE application client. These remote parts of the application are often not well-suited to run as an application client for many reasons, including, for example:

(A) The memory and CPU footprints of the application client container are too large;
(B) Java code is required;
(C) The communication protocol (Java Remote Method Invocation technology run over Internet Inter-Orb Protocol (RMI/IIOP)) is not firewall friendly; and
(D) Platform support issues—not every client platform is supported (especially mobile devices).

Several known solutions exist for this problem. In a first solution, the application runs in a "thin" client. The thin application client provides a lightweight, downloadable Java application run time capable of interacting with Enterprise Java Beans (EJBs). This client is designed to support those users who want a lightweight Java client application programming environment, without the overhead of the J2EE platform on the client machine. The programming model for this client is heavily influenced by the CORBA programming model, but supports access to EJBs. This solution suffers from several drawbacks including, for example:

(A) It only addresses the problem of large CPU and memory footprints.
(B) Java code is still required; and
(B) It is not firewall friendly.

In another known solution for the above-described problem, the server provides Web services. As known in the art, Web services is a technology that allows applications to communicate with each other in a platform and programming language independent manner. A Web service is a software interface that describes a collection of operations that can be accessed over a network through standardized Extensible Markup Language (XML) messaging. It uses protocols based on the XML language to describe an operation to execute or data to exchange with another Web service. This solution suffers from several drawbacks including, for example:

(A) Creates a performance bottle-neck. Not suited for bulk data transfers or high traffic communication; and
(B) Security and transaction support are very limited and are far from the level of sophistication provided by J2EE.

SUMMARY OF THE INVENTION

In general, the present invention provides a method, system, and computer program product for providing access to Java 2 Enterprise Edition (J2EE) application servers from non-J2EE application clients. In particular, in accordance with the present invention, a non-J2EE application client sends its data to a staging area and then uses a Java Message Service (JMS) Web service to notify a J2EE application server that new data is available. The staging area can be any database that provides a Java Database Connectivity (JDBC) driver or any Enterprise Information System (EIS) that provides a J2EE Connecter (J2C) Resource Adapter. The JMS message sent to the J2EE application server contains the name of an adapter (e.g., Resource Adapter or Data Source) that is capable of retrieving data from the staging area. A Message Driven Bean running on the J2EE application server looks up the adapter in the J2EE application server's JNDI namespace (if necessary, the Message Driven Bean can configure it on-the-fly based on certain headers in the JMS message). The Message Driven Bean then uses the adapter to retrieve (i.e., "pull") the data from the staging area in a secure, efficient, firewall-friendly, and transaction-capable manner. After the Message Driven Bean has retrieved the data from the staging area, it obtains EJBs of the application client from the application server's JNDI namespace and uses the EJBs to insert (i.e., "push") the retrieved data into a local database of the J2EE application server. It should be noted that the present invention can also be used with J2EE application clients to offload processing from the application clients, thereby freeing up processing/memory on the application clients.

A first aspect of the present invention is directed to a method for providing access to a Java 2 Enterprise Edition (J2EE) application server from an application client, comprising: sending data from the application client to a staging area; sending a message from the application client to the J2EE application server, the message notifying the J2EE application server that data is available in the staging area and providing a name of an adapter that can retrieve the data from the staging area; obtaining the adapter using a Message Driven Bean, wherein the Message Driven bean retrieves the data from the staging area using the adapter; and inserting the retrieved data into a database of the J2EE application server using the Message Driven Bean.

A second aspect of the present invention is directed to a system for providing access to a Java 2 Enterprise Edition (J2EE) application server from an application client, comprising: a system for sending data from the application client to a staging area; a system for sending a message from the application client to the J2EE application server, the message notifying the J2EE application server that data is available in the staging area and providing a name of an adapter that can retrieve the data from the staging area; a system for obtaining the adapter using a Message Driven Bean, wherein the Message Driven bean retrieves the data from the staging area using the adapter; and a system for inserting the retrieved data into a database of the J2EE application server using the Message Driven Bean.

A third aspect of the present invention is directed to a program product stored on a recordable medium for providing access to a Java 2 Enterprise Edition (J2EE) application server from an application client, which when executed comprises: program code for sending data from the application client to a staging area; program code for sending a message from the application client to the J2EE application server, the message notifying the J2EE application server that data is available in the staging area and providing a name of an adapter that can retrieve the data from the staging area; program code for obtaining the adapter using a Message Driven Bean, wherein the Message Driven bean retrieves the data from the staging area using the adapter; and program code for inserting the retrieved data into a database of the J2EE application server using the Message Driven Bean.

A fourth aspect of the present invention is directed to a method for deploying an application for providing access to a Java 2 Enterprise Edition (J2EE) application server from an application client, comprising: providing a computer infrastructure being operable to: send data from the application client to a staging area; send a message from the application client to the J2EE application server, the message notifying the J2EE application server that data is available in the staging area and providing a name of an adapter that can retrieve the data from the staging area; obtain the adapter using a Message Driven Bean, wherein the Message Driven bean retrieves the data from the staging area using the adapter; and insert the retrieved data into a database of the J2EE application server using the Message Driven Bean.

A fifth aspect of the present invention is directed to computer software embodied in a propagated signal for providing access to a Java 2 Enterprise Edition (J2EE) application server from an application client, the computer software comprising instructions to cause a computer system to perform the following functions: send data from the application client to a staging area; send a message from the application client to the J2EE application server, the message notifying the J2EE application server that data is available in the staging area and providing a name of an adapter that can retrieve the data from the staging area; obtain the adapter using a Message Driven Bean, wherein the Message Driven bean retrieves the data from the staging area using the adapter; and insert the retrieved data into a database of the J2EE application server using the Message Driven Bean.

BRIEF DESCRIPTION OF THE DRAWINGS

These and other features of this invention will be more readily understood from the following detailed description of the various aspects of the invention taken in conjunction with the accompanying drawings in which.

Figure 1:
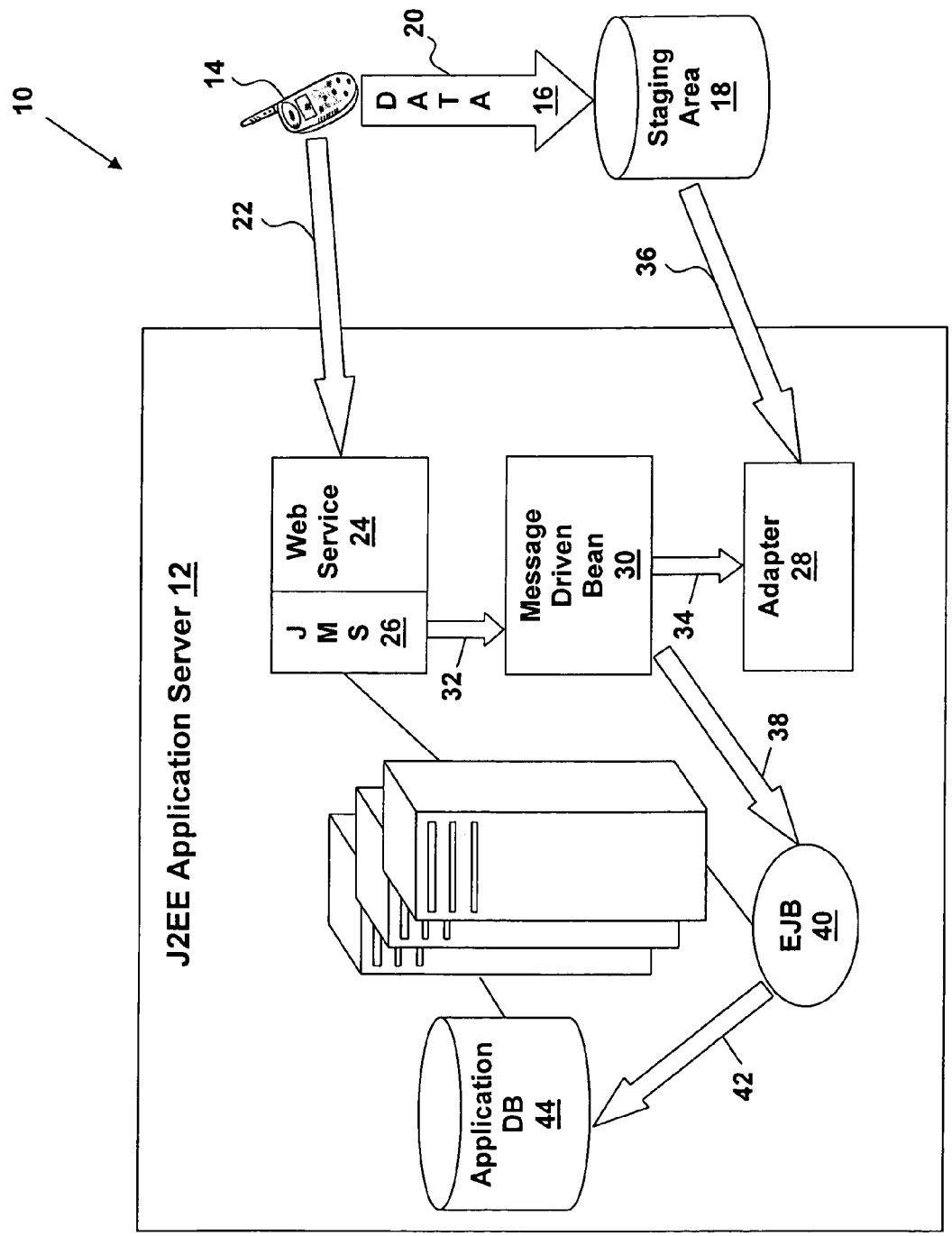
FIG. 1 depicts a system for providing access to a J2EE application server from a non-J2EE application client in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system, and computer program product for providing access to Java 2 Enterprise Edition (J2EE) application servers from non-J2EE application clients. In accordance with the present invention, a non-J2EE application client sends its data to a staging area and then uses a Java Message Service (JMS) Web service to notify a J2EE application server that new data is available. The JMS message sent to the J2EE application server contains the name of an adapter (e.g., Resource Adapter or Data Source) that is capable of retrieving data from the staging area. A Message Driven Bean running on the J2EE application server looks up the adapter in the J2EE application server's JNDI namespace and then uses the adapter to retrieve the data from the staging area in a secure, efficient, firewall-friendly, and transaction-capable manner. After the Message Driven Bean has retrieved the data from the staging area, it obtains Enterprise Java Beans (EJBs) of the application client from the application server's JNDI namespace and uses the EJBs to insert the retrieved data into a local database of the J2EE application server.

It is assumed that the reader has an understanding of J2EE commensurate with one skilled in the art. Therefore, a detailed description of Java, J2EE, J2EE-based client-server systems, Java Message Service, Message Driven Beans, Enterprise Java Beans, Resource Adapters, Data Sources, and other Java-related systems/processes referenced in the present disclosure will not be provided herein. Further information regarding J2EE can be found, for example, at http://java.sun.com/j2ee/index.jsp. The J2EE Specification, v1.4, which is incorporated herein by reference, can be found at http://java.sun.com/j2ee/j2ee-1_4-fr-spec.pdf.

A client-server system 10 for providing access to a J2EE application server 12 from a non-J2EE application client 14 in accordance with an embodiment of the present invention 10 is depicted in FIG. 1. Initially, the application client 14 sends data 16 destined for the J2EE application server 12 to a staging area 18, where it is stored. This is indicated by directional arrow 20 in FIG. 1. The staging area 18 can be any database that provides a JDBC driver or any EIS that provides a J2C Resource Adapter.

The application client 14 then accesses (arrow 22) a JMS Web service 24 to send a JMS message 26 to the J2EE application server 12. The JMS message 26 notifies the J2EE application server 12 that new data 16 from the application client 14 is available in the staging area 18. The JMS message 26 sent to the J2EE application server 12 also contains the name of an adapter 28 (e.g., Resource Adapter or Data Source) that is capable of communicating with and retrieving data 16 from the staging area 18. As shown in FIG. 1, the JMS Web service 24 can be provided by the J2EE application server 12. Alternately, the JMS Web service 24 can be provided separately from the J2EE application server 12 (e.g., by another J2EE application server or other suitable system). The JMS message 26 can be provided to the J2EE application server 12 before, at the same time, or after the data 16 is sent to the staging area 18.

A Message Driven Bean 30 running on the J2EE application server 12 is notified (arrow 32) of the name of the adapter 28, and looks up (arrow 34) the adapter 28 in the JNDI namespace of the J2EE application server 12 (if necessary, the Message Driven Bean 30 can configure it on-the-fly based on certain headers in the JMS message 26). The Message Driven Bean 30 then uses the adapter 28 to retrieve (arrow 36) the stored data 16 from the staging area 18 in a secure, efficient, firewall-friendly, and transaction-capable manner. Information regarding the operation of the adapter 28 can be found, for example, at http://java.sun.com/developer/technicalArticles/J2EE/connectorclient/resourceadapter.html.

After the Message Driven Bean 30 has retrieved the data 16 from the staging area 18, the Message Driven Bean obtains (arrow 38) EJBs 40 of the client application 14 from the JNDI namespace of the J2EE application server 12 and uses the EJBs 40 to insert (arrow 42) the retrieved data 16 into a local database 44 of the J2EE application server 12.

It should be noted that the present invention can also be used with J2EE application clients. By doing so, J2EE-related processing can be offload from the application clients, freeing up processing/memory on the application clients for other uses.

The present invention provides many advantages over prior art techniques including, for example:
(A) No minimal footprint requirement on the application client;
(B) Firewall friendly since the JMS message from the application client uses JMS over Web services;
(C) The request from the J2EE application server to the staging area is firewall friendly since it is an outgoing versus incoming request;
(D) Using Resource Adapters and Data Sources makes security transparent to the application client and provides transaction capabilities;
(E) The application client can be programming language and platform independent since it is free to store data in the staging area via any means necessary and since Web services are used to send the JMS message;
(F) Provides a single point of entry for all application clients (J2EE or non-J2EE) where security can be centrally administered and transaction level monitoring can occur; and
(G) Useful for flows that are asynchronous/one-way from the perspective of the application client (e.g., application client does not have to wait for data to be input into J2EE application server).

In an optimization of present invention, the application client 14 sends the data 16 directly to the J2EE application server 12 in the JMS message 26 itself and bypasses the staging area 18. This optimization could be used, for example, when there is not much data to send to the J2EE application server 12 (the JMS protocol is not well-suited for large data transfers). Other factors which could influence the decision of whether or not to take the optimized path could be determined at run-time based on application deployment characteristics, currently available hardware and network resources, and heuristics based on historical metrics.

Figure 2:
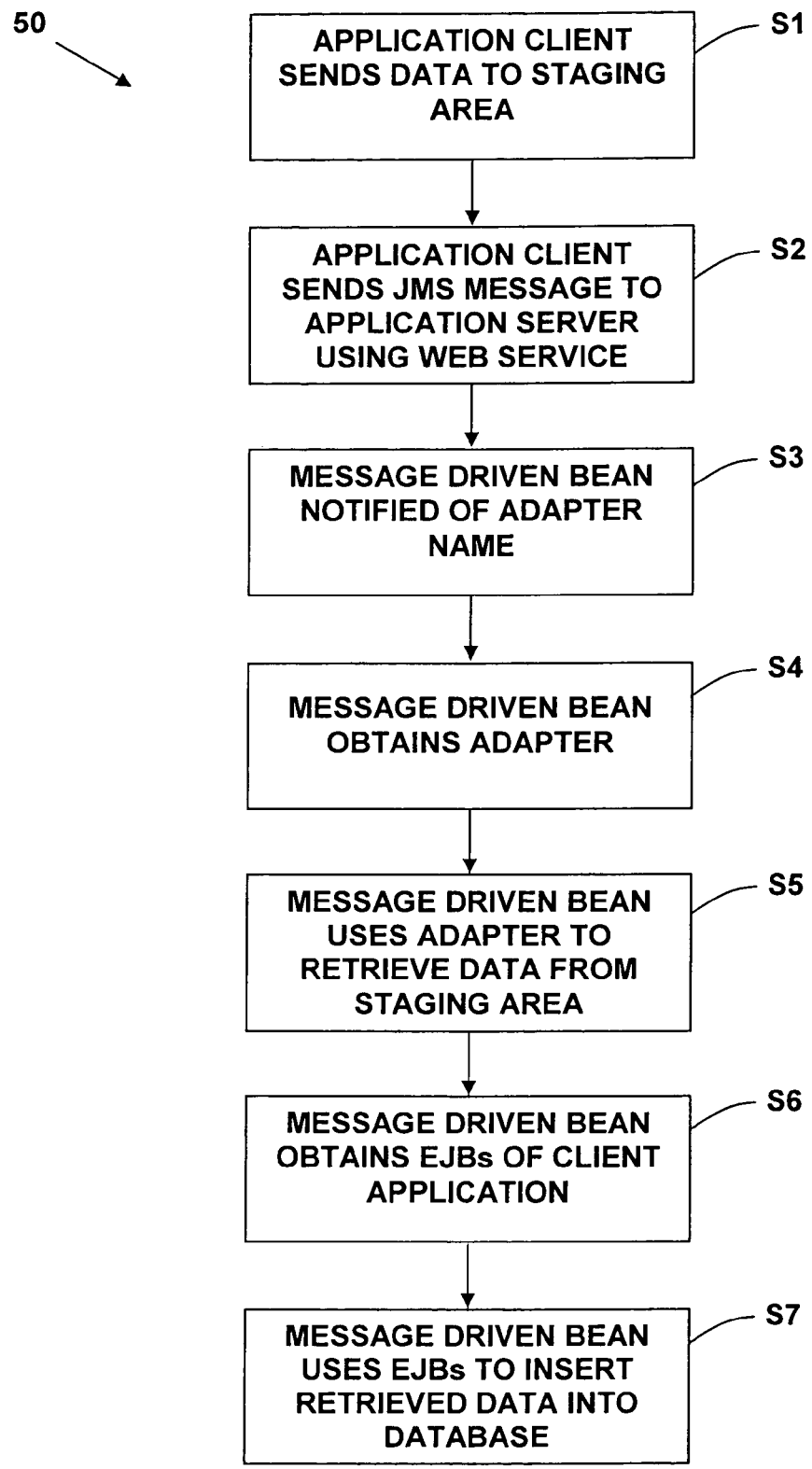
FIG. 2 depicts a flow diagram of a method in accordance with an embodiment of the present invention.

A flow diagram 50 depicting a method in accordance with an embodiment of the present invention is illustrated in FIG. 2, which will be described below in connection with the components of the client-server system 10 of FIG. 1. In step S1, the application client 14 sends data 16 destined for the J2EE application server 12 to the staging area 18, where it is stored. In step S2, the application client 14 uses Web service 24 to send a JMS message 26 to the J2EE application server 12. The JMS message 26 notifies the J2EE application server 12 of the presence of new data 16 from the application client 14 in the staging area 18 and provides the name of the adapter 28 to be used to retrieve the data 16 from the staging area 18. In step S3, the Message Driven Bean 30 is notified of the name of the adapter 28. In step S4, the Message Driven Bean 30 obtains the adapter 28 from the JNDI namespace of the J2EE application server 12 and optionally configures it with properties that were passed in the JMS message 26. In step S5, the Message Driven Bean 30 uses the adapter 28 to retrieve the data 16 sent to the staging area 18 by the application client 14. In step S6, the Message Driven Bean 30 obtains the EJBs of the client application 14 from the JNDI namespace of the J2EE application server 12. In step S7, the Message Driven Bean uses the EJBs 40 of the application client 14 to insert the retrieved data 16 into a local database 44 of the J2EE application server 12.

Figure 3:
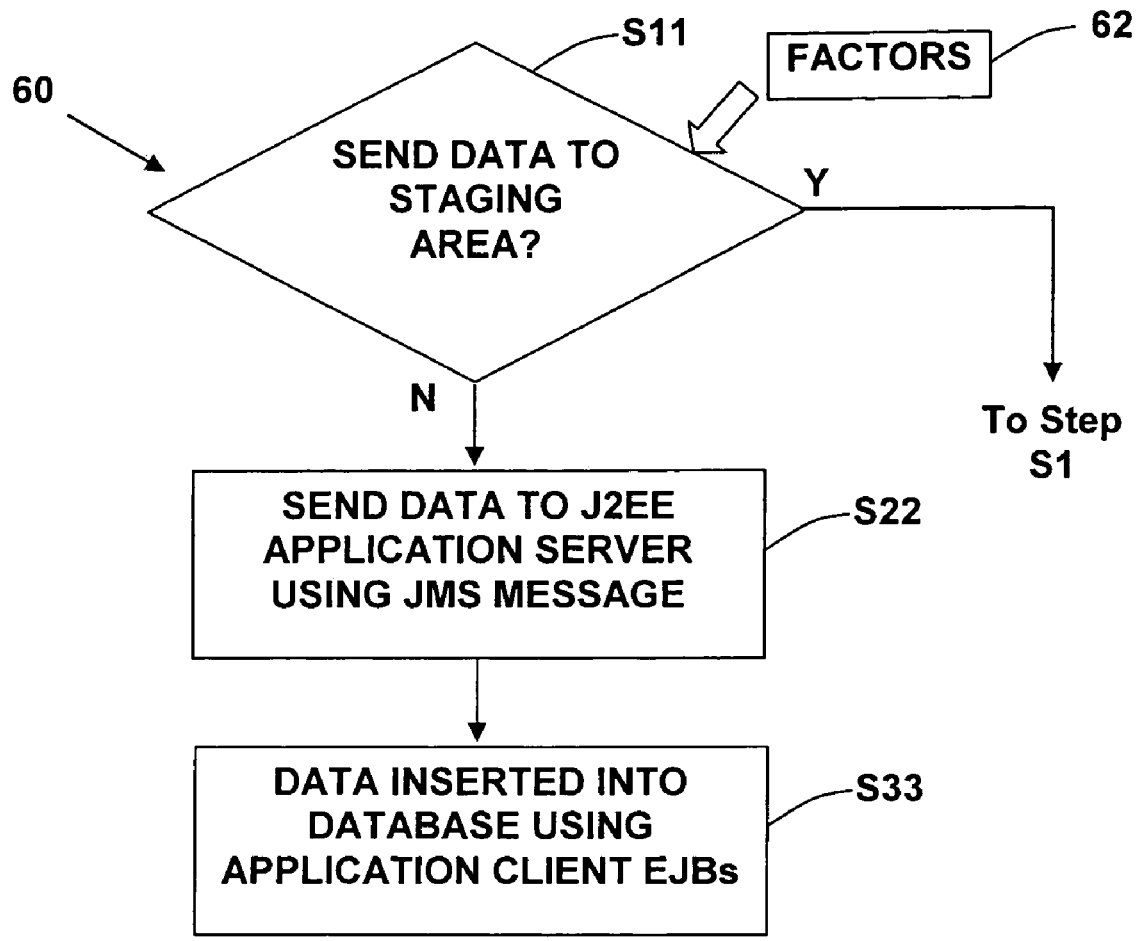
FIG. 3 depicts a flow diagram of a method in accordance with another embodiment of the present invention.

A flow diagram 60 depicting a method in accordance with another embodiment of the present invention is illustrated in FIG. 3. In step S11, the application client 14 determines, based on one or more factors 62, if it should to send the data 16 directly to the J2EE application server 12 in the JMS message 26 itself, thereby bypassing the staging area 18, or if it should send the data 16 to the staging area 18. If the data 16 is to be sent to the staging area 18, flow passes to step S1 of FIG. 2. If the data 16 is to be included in the JMS message 26, flow passes to step S22, where the data 16 is incorporated into the JMS message 26 sent to the J2EE application server 12. In step S33, the data 16 is inserted into the local database 44 using the EJBs 40 of the application client 12.

Figure 4:
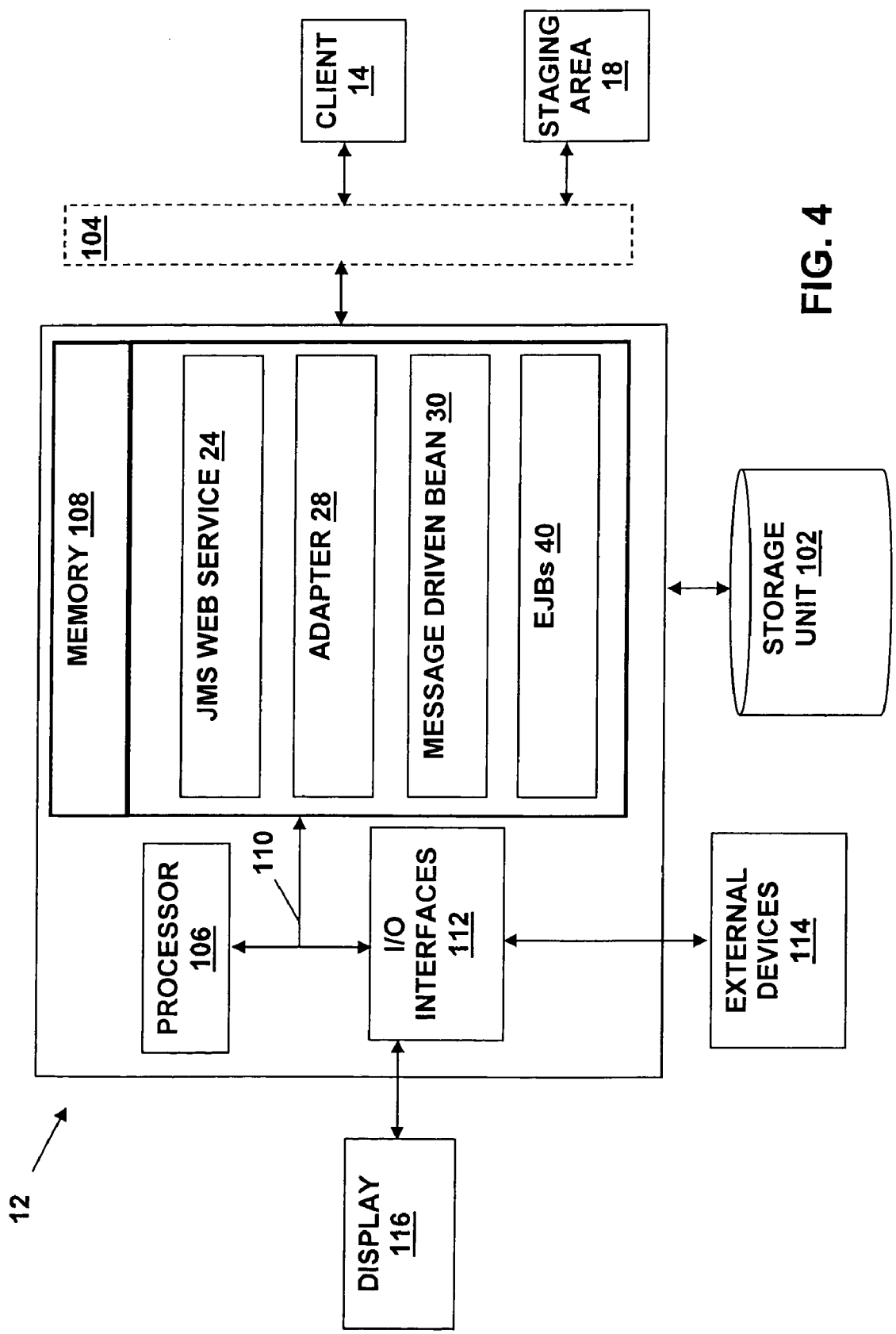
FIG. 4 depicts the client-server system of FIG. 1 in greater detail.

The J2EE application server 12 is illustrated in greater detail in FIG. 4. As shown, the J2EE application server 12 generally includes a processor 106, memory 108, bus 110, input/output (I/O) interfaces 112 and external devices/resources 114. Processor 106 may comprise a single processing unit, or may be distributed across one or more processing units in one or more locations, e.g., on a client and server. Memory 108 may comprise any known type of data storage and/or transmission media, including magnetic media, optical media, random access memory (RAM), read-only memory (ROM), etc. Moreover, similar to processor 106, memory 108 may reside at a single physical location, comprising one or more types of data storage, or be distributed across a plurality of physical systems in various forms.

I/O interfaces 112 may comprise any system for exchanging information to/from an external source. External devices/resources 114 may comprise any known type of external device, including speakers, a CRT, LED screen, handheld device, keyboard, mouse, voice recognition system, speech output system, printer, monitor/display (e.g., display 116), facsimile, pager, etc.

Bus 110 provides a communication link between each of the components in the J2EE application server 12, and likewise may comprise any known type of transmission link, including electrical, optical, wireless, etc. In addition, although not shown, additional components, such as cache memory, communication systems, system software, etc., may be incorporated into the J2EE application server 12.

Data used in the practice of the present invention can be stored locally to J2EE application server 12, for example, in storage unit 102, and/or may be provided to J2EE application server 12 over a network 104. Storage unit 102 can be any system capable of providing storage for data and information under the present invention. As such, storage unit 102 may reside at a single physical location, comprising one or more types of data storage, or may be distributed across a plurality of physical systems in various forms. In another embodiment, storage unit 102 may be distributed across, for example, a local area network (LAN), wide area network (WAN) or a storage area network (SAN) (not shown).

Network 104 is intended to represent any type of network over which data can be transmitted. For example, network 104 can include the Internet, a wide area network (WAN), a local area network (LAN), a virtual private network (VPN), a WiFi network, or other type of network. To this extent, communication can occur via a direct hardwired connection or via an addressable connection in a client-server (or server-server) environment that may utilize any combination of wireline and/or wireless transmission methods. In the case of the latter, the server and client may utilize conventional network connectivity, such as Token Ring, Ethernet, WiFi or other conventional communications standards. Where the client communicates with the server via the Internet, connectivity could be provided by conventional TCP/IP sockets-based protocol. In this instance, the client would utilize an Internet service provider to establish connectivity to the server.

The application client 14 is connected to the J2EE application server 12 over network 104. Although not shown, application client 14 includes many of the same components described above with regard to the J2EE application server 12. Also illustrated is a staging area 18 for storing data 16 provided by the application client 14.

Shown in memory 108 is a JMS Web service 24. After sending data 16 to the staging area 18 to be stored, the application client 14 sends a JMS message 26 to the J2EE application server 12 using the JMS Web service 24. The JMS message 26 notifies the J2EE application server 12 that new data 16 from the application client 14 is available in the staging area 18. The JMS message 26 sent to the J2EE application server 12 also contains the name of an adapter 28 (e.g., Resource Adapter or Data Source) that is capable of communicating with and retrieving data 16 from the staging area 18.

Also shown in memory 108 is a Message Driven Bean 30. After being notified of the name of the adapter 28, the Message Driven Bean 30 looks up the adapter 28 in the JNDI namespace of the J2EE application server 12 and uses the adapter 28 to retrieve the data 16 from the staging area 18 in a secure, efficient, firewall-friendly, and transaction-capable manner. The retrieved data 16 can be stored in storage unit 102 using EJBs 40 of the application client 12.

It should be appreciated that the teachings of the present invention can be offered as a business method on a subscription or fee basis. For example, J2EE application server 12 could be created, maintained, supported, and/or deployed by a service provider that offers the functions described herein for customers. That is, a service provider could be used to provide access to J2EE application servers from non-J2EE application clients, as describe above.

It should also be understood that the present invention can be realized in hardware, software, a propagated signal, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

We claim:

1. A method for providing access to a Java 2 Enterprise Edition (J2EE) application server from an application client, comprising:

sending data from the application client to a staging area, wherein the application client comprises a non-J2EE application client, and wherein the staging area comprises a database or an Enterprise Information System that provides a Resource Adapter;

sending a message from the application client to the J2EE application server, the message notifying the J2EE application server that data is available in the staging area and providing a name of an adapter that can retrieve the data from the staging area, wherein the adapter comprises a Resource Adapter or Data Source, and wherein sending a message from the application client to the J2EE application server further comprises: accessing a message service Web service from the application client, and using the message service Web service to send the message from the application client to the J2EE application server;

obtaining the adapter using a Message Driven Bean, wherein the Message Driven Bean retrieves the data from the staging area using the adapter; and inserting the retrieved data into a database of the J2EE application server using the Message Driven Bean, wherein inserting the retrieved data into a database of the J2EE application server using the Message Driven Bean further comprises: obtaining at least one Enterprise Java Bean (EJB) for the application client from the J2EE application server, and using the at least one EJB to insert the retrieved data into the database; and optionally sending the data directly to the J2EE application server in the message, and inserting the data into a database of the J2EE application server.

2. A system for providing access to a Java 2 Enterprise Edition (J2EE) application server from an application client, comprising:

at least one computer, comprising:

a data sending system for sending data from the application client to a staging area, wherein the application client comprises a non-J2EE application client, and wherein the staging area comprises a database or an Enterprise Information System that provides a Resource Adapter;

a message sending system for sending a message from the application client to the J2EE application server, the message notifying the J2EE application server that data is available in the staging area and providing a name of an adapter that can retrieve the data from the staging area, wherein the adapter comprises a Resource Adapter or Data Source, and wherein the message sending system for sending a message from the application client to the J2EE application server further comprises: an accessing system for accessing a message service Web service from the application client, and a Web service sending system for using the message service Web service to send the message from the application client to the J2EE application server;

an obtaining system for obtaining the adapter using a Message Driven Bean, wherein the Message Driven Bean retrieves the data from the staging area using the adapter; and an inserting system for inserting the retrieved data into a database of the J2EE application server using the Message Driven Bean, wherein the inserting system for inserting the retrieved data into a database of the J2EE application server using the Message Driven Bean further comprises: a Bean obtaining system for obtaining at least one Enterprise Java Bean (EJB) for the application client from the J2EE application server, and an inserting system for using the at least one EJB to insert the retrieved data into the database; and an optional sending and inserting system for optionally sending the data directly to the J2EE application server in the message, and for inserting the data into a database of the J2EE application server.

3. A program product stored on a recordable medium, which when executed, provides access to a Java 2 Enterprise Edition (J2EE) application server from an application client, the program product comprising program code for:

sending data from the application client to a staging area, wherein the application client comprises a non-J2EE application client, and wherein the staging area comprises a database or an Enterprise Information System that provides a Resource Adapter;

sending a message from the application client to the J2EE application server, the message notifying the J2EE application server that data is available in the staging area and providing a name of an adapter that can retrieve the data from the staging area, wherein the adapter comprises a Resource Adapter or Data Source, and wherein sending a message from the application client to the J2EE application server further comprises: accessing a message service Web service from the application client, and using the message service Web service to send the message from the application client to the J2EE application server;

obtaining the adapter using a Message Driven Bean, wherein the Message Driven Bean retrieves the data from the staging area using the adapter; and inserting the retrieved data into a database of the J2EE application server using the Message Driven Bean, wherein inserting the retrieved data into a database of the J2EE application server using the Message Driven Bean further comprises: obtaining at least one Enterprise Java Bean (EJB) for the application client from the J2EE application server, and using the at least one EJB to insert the retrieved data into the database; and optionally sending the data directly to the J2EE application server in the message, and inserting the data into a database of the J2EE application server.

* * * * *